United States Patent [19]
Mackie

[11] Patent Number: 6,128,596
[45] Date of Patent: Oct. 3, 2000

[54] METHOD, DEVICE AND SYSTEM FOR GENERALIZED BIDIRECTIONAL ISLAND-DRIVEN CHART PARSING

[75] Inventor: Andrew William Mackie, Schaumburg, Ill.

[73] Assignee: Motorola, Inc., Schaumburg, Ill.

[21] Appl. No.: 09/054,601

[22] Filed: Apr. 3, 1998

[51] Int. Cl.[7] .................................................. G10L 15/16
[52] U.S. Cl. ........................... 704/257; 704/259; 704/256
[58] Field of Search .................................... 704/257, 256, 704/259, 9, 10

[56] References Cited

U.S. PATENT DOCUMENTS

| | | |
|---|---|---|
| 4,984,178 | 1/1991 | Hamphill et al. . |
| 5,060,155 | 10/1991 | Van Zuijlen ............................. 704/257 |
| 5,960,384 | 9/1999 | Brash .......................................... 704/9 |
| 5,963,742 | 10/1999 | Williams ..................................... 704/9 |

OTHER PUBLICATIONS

Mellish, Chris, David Allport, Anthony F. Hartley, Roger Evans, Lynne J. Cahill, Robert Gaizauskas, and John Walker. 1992. The TIC message analyser Cognitive Science Research Paper Serial No. CSRP 225, University of Sussex, Brighton, U.K.

Oerder, Martin, and Hermann Ney. 1993. Word graphs: An efficient interface between continuous–speech recognition and language understanding. ICASSP–93, vol. 2, 119–122.
Tashiro, Toshihisa, Toshiyuki Takezawa, Tsuyoshi Morimoto, and Masaaki Nagata. 1994. Efficient chart parsing of speech recognition candidates. ICASSP–94, vol. 2, 13–16.
van Noord, Gertjan. 1997. An efficient implementation of the head–corner parser. Computational Linguistics 23(3): 425–456.

*Primary Examiner*—David R. Hudspeth
*Assistant Examiner*—Daniel Abebe
*Attorney, Agent, or Firm*—Douglas D. Fekete

[57] ABSTRACT

A method (700), device (1101), and system (1100) provide generalized bidirectional island-driven chart parsing based on congruency checking to prevent edge overgeneration for robust and efficient parsing of a word graph. The method prevents edge overgeneration by selecting, in accordance with a predetermined scheme, a candidate edge with a starting vertex, an ending vertex, a label, and a congruence key for entry in a chart from an agenda of edges, selecting an edge equivalence set in the chart that matches the starting vertex, the ending vertex, and the label of the candidate edge, and entering the candidate edge into the chart if the congruence key of the candidate edge fails to match the congruence key of any edge in the edge equivalence set.

21 Claims, 13 Drawing Sheets

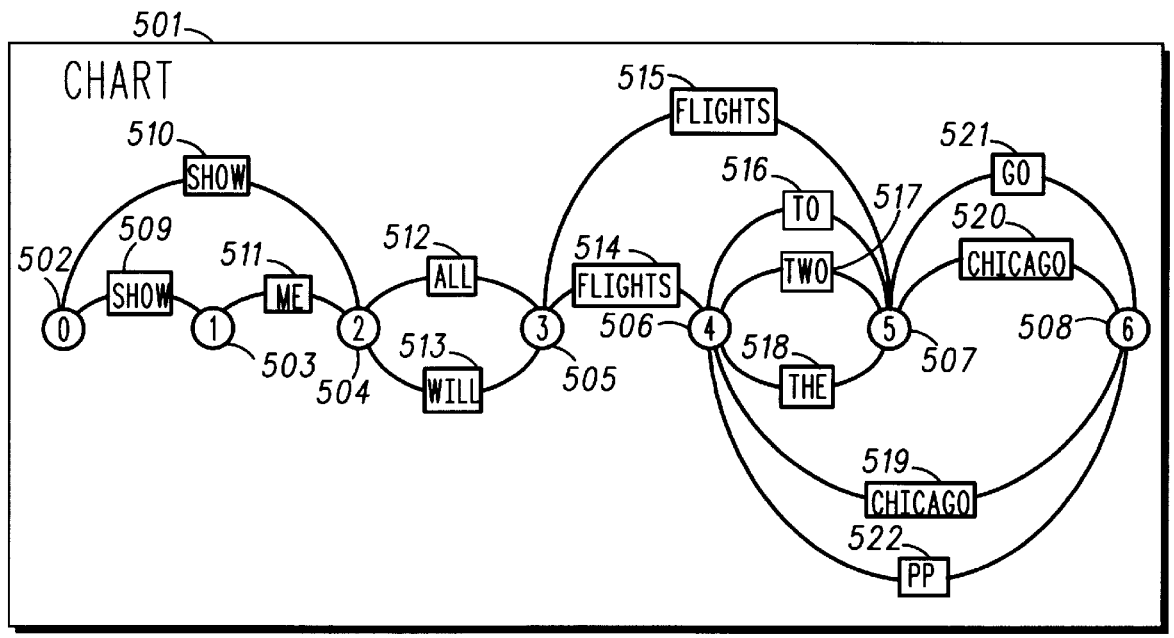
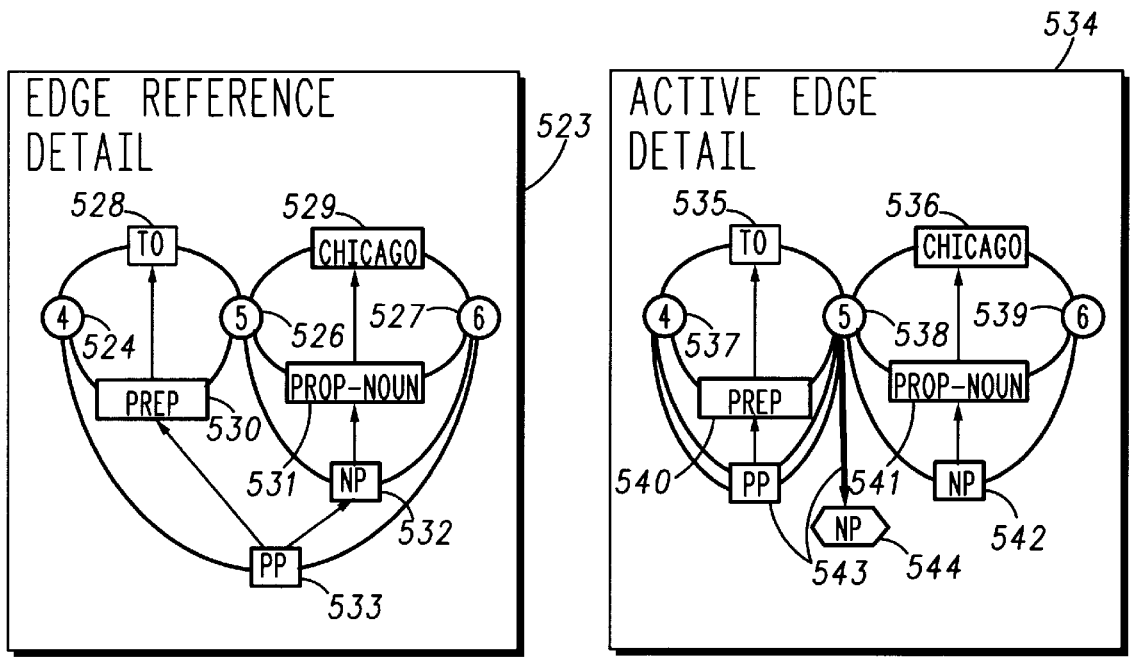
— PRIOR ART —
FIG. 5

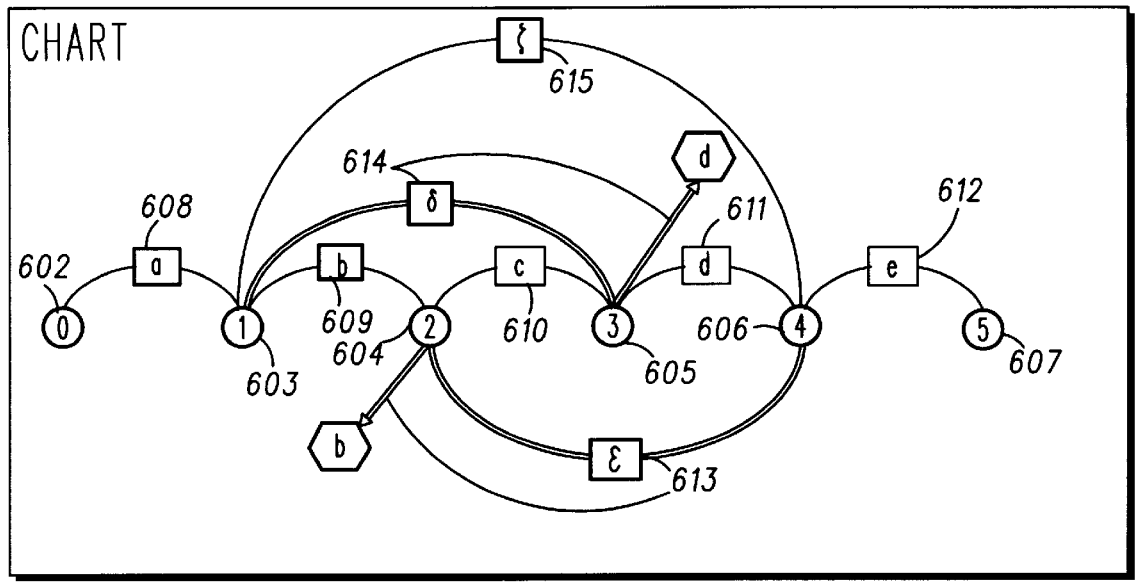
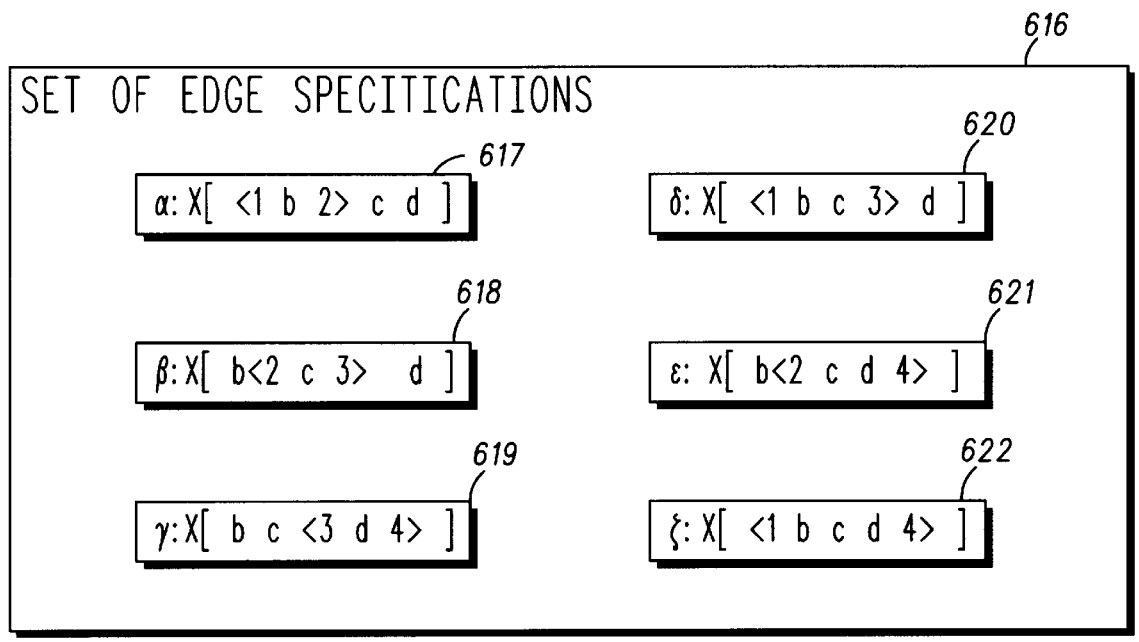
FIG. 6

(A)

↓ _708_

PRIOR TO THE PAIRWISE COMPARISON OF THE VECTOR ENCODING THE CONGRUENCE KEY FOR THE EDGE $E_1$ WITH THE VECTOR ENCODING THE CONGRUENCE KEY FOR THE EDGE $E_2$, PERFORMING A THRESHOLD TEST COMPRISING THE STEPS OF:

A) DETERMINING A LENGTH $L_1$ OF THE VECTOR $V_1$ ENCODING THE CONGRUENCE KEY FOR THE EDGE $E_1$ AND A LENGTH $L_2$ OF THE VECTOR $V_2$ ENCODING THE CONGRUENCE KEY FOR THE EDGE $E_2$; AND

B) COMPARING THE LENGTH $L_1$ OF THE VECTOR $V_1$ AND THE LENGTH $L_2$ OF THE VECTOR $V_2$; AND

C) SIGNALING EDGE NON-CONGRUENCY IF $L_1 \neq L_2$ AND SIGNALING EDGE CONGRUENCY IF $L_1 = L_2$

↓ _709_

COMPARING THE CONGRUENCE KEY FOR AN EDGE $E_1$ WITH THE CONGRUENCE KEY FOR AN EDGE $E_2$ AND IS ACOMPLISHED BY A PAIRWISE COMPARISON OF A VECTOR $V_1$ ENCODING THE CONGRUENCE KEY FOR THE EDGE $E_1$ WITH A VECTOR $V_2$ ENCODING THE CONGRUENCE KEY FOR THE EDGE $E_2$

*FIG. 7B*

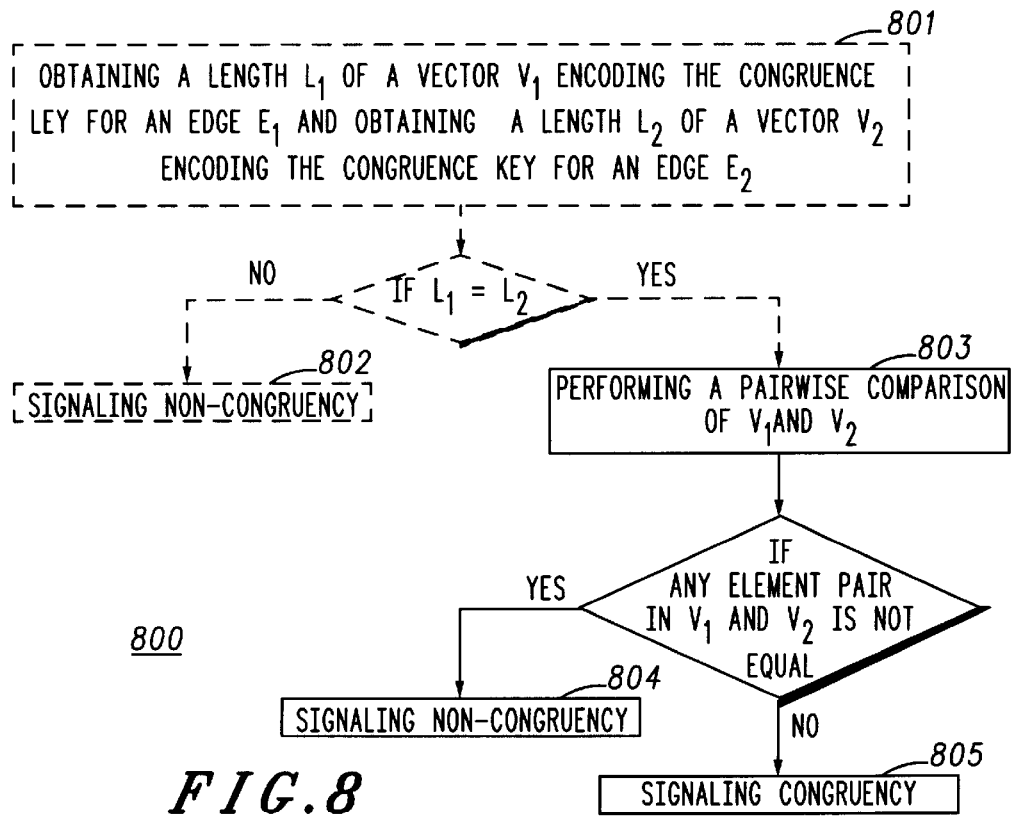

*FIG. 8*

METHOD, DEVICE AND SYSTEM FOR GENERALIZED BIDIRECTIONAL ISLAND-DRIVEN CHART PARSING

FIELD OF THE INVENTION

The present invention relates to natural-language parsing, and more particularly to natural-language parsing that is suitable for automatic speech recognition.

BACKGROUND OF THE INVENTION

As shown in FIG. 1, numeral 100, a semantic representation (110) is generated from a natural-language utterance (101) by the following three-step process. The natural-language utterance is perceived by a speech recognizer (102), which is coupled to a lexicon (103) containing a plurality of words of the natural language. The speech recognizer outputs a word graph (104), containing at least one word from the lexicon that is hypothesized to correspond to the natural-language utterance. The word graph is input into a parser (105), which is coupled to a grammar (106) for the natural language. Using the grammar, the parser constructs a parse forest (107). The parse forest is input into a semantic interpreter (108), which is coupled to a knowledge base (109). The semantic interpreter processes the parse forest according to a predetermined semantics and outputs the semantic representation corresponding to the natural-language utterance.

As shown in FIG. 2, numeral 200, a word graph (201) is an acyclic directed graph that contains a plurality of vertices connected by arcs. Each vertex has a unique label that permits a strict ordering of the vertices from a start vertex (202), labeled $t_0$, to an end vertex (203), labeled $t_7$. The labels on the vertices typically correspond to frame identifiers generated during the processing of a speech signal. Each arc in the word graph is labeled by a word from the lexicon; for example, the arc (204) is labeled by the word "show", hypothesized as occurring between the vertex labeled $t_0$ and the vertex labeled $t_1$, while the arc (205) is labeled by the word "show", hypothesized as occurring between the vertex labeled $t_0$ and the vertex labeled $t_2$. As is known in the art, the use of the word graph improves the robustness of the speech recognizer by allowing it to hypothesize alternative words occurring during the same segment of the speech signal. However, the number of paths through the word graph is typically very large; in order to constrain the resulting search space, the natural language to be recognized is formally defined by a context-free (CF) grammar (301). As shown in FIG. 3, numeral 300, a CF grammar G for a language L is formally defined as $G_L = <V_N, V_T, S, P>$, where:
1. $V_N$ is a finite non-empty set of nonterminal symbols (302).
2. $V_T$ is a finite non-empty set of terminal symbols (303), corresponding to the words in the lexicon of the language L.
3. $V_N$ and $V_T$ are disjoint sets ($V_N \cap V_T = \phi$).
4. S is a finite non-empty set of start symbols (304); $S \subseteq V_N$.
5. $\Sigma$ is an alphabet consisting of all nonterminal and terminal symbols in the grammar $G_L (\Sigma = V_N \cup V_T)$.
6. A string $Z \epsilon \Sigma^*$ is a sequence of at least one symbol from the alphabet $\Sigma$.
7. P is a finite non-empty set of productions (305) mapping $V_N$ to $\Sigma^*$.

A production (306) encodes a relationship of the form "X→Y" ("X rewrites as Y*"), where $X \epsilon V_N$ and each $Y \epsilon \Sigma$. Each production in P may have additional information associated with it such as a probability of occurrence for the production, a semantic representation of the production, etc., as is known in the art. A string $\Sigma^*Y\Sigma^*$ is "directly derived" from a string $\Sigma^*X\Sigma^*$ (written as: $\Sigma^*X\Sigma^* \Rightarrow \Sigma^*Y\Sigma^*$) iff ("iff" means "if and only if") the production "X→Y*" is a member of P. A string $\Sigma^*Y\Sigma^*$ is "derived" from a string $\Sigma^*X\Sigma^*$ (written as: $\Sigma^*X\Sigma^* \Rightarrow \Sigma^*Y\Sigma^*$) iff an ordered set of strings $D = \{D_0, \ldots, D_n\}$ exists such that each $D_{i+1}$ is directly derived from $D_i$. A string $U \epsilon V_T^*$ is a sentence of L iff U is derived from one start symbol $X \epsilon S$.

As shown in FIG. 4, numeral 400, a parse forest (401) contains at least one phrase-structure (PS) tree (402, 403). A PS tree contains at least one nonterminal node (404) and at least one terminal node (405). A nonterminal node is labeled by one nonterminal symbol from the grammar and must dominate at least one other node; for example, the nonterminal node (404) is labeled "S" and dominates the nonterminal node (406), which is labeled "VP". Each terminal node in the PS tree is labeled by a terminal symbol from the grammar and corresponds to one arc in the word graph. The topmost node of the PS tree is labeled by one start symbol of the grammar and the ordered set of terminal node labels of the PS tree is the "yield" of the PS tree. The yield of the PS tree corresponds to one path through the word graph that connects the start vertex with the end vertex. Thus the terminal node (405), labeled with the word "show", in the PS tree (402) corresponds to the arc (204) in the word graph (201), instead of the arc (205), because only the arc (204) is on the path through the word graph that corresponds to the yield of the PS tree (402). However, the terminal node (411), labeled with the word "show", in the PS tree (403) corresponds to the arc (205) in the word graph (201), instead of the arc (204), because only the arc (205) is on the path through the word graph that corresponds to the yield of the PS tree (403). The natural-language utterance "Show me all flights to Chicago" is analyzed as six terminal nodes in the PS tree (402), with each terminal node labeled by a single word. The remainder of the PS tree is constructed by use of the productions in the grammar; for example, the prepositional phrase "to Chicago" (corresponding to the nonterminal node (407), labeled "PP") is constructed by the use of four productions, as follows:
1. "prep→to" (309), resulting in the nonterminal node (407).
2. "prop-noun→Chicago" (310), resulting in the nonterminal node (410).
3. "NP→prop-noun" (308), resulting in the nonterminal node (409).
4. "PP→prep NP" (307), resulting in the nonterminal node (407).

As shown in FIG. 5, numeral 500, both the word graph and the parse forest may be simultaneously stored in a chart (501) containing a plurality of vertices connected by edges. The use of the chart permits the simultaneous representation of mutually exclusive hypotheses, as is known in the art. The chart in FIG. 5 contains seven vertices, respectively labeled "0" (502), "1" (503), "2" (504), "3" (505), "4" (506), "5" (507), and "6" (508). Each edge in the chart is labeled with a word from the word graph or a nonterminal symbol from the grammar. For example, the two instances of the word "show" in the graph are encoded as "[0 show 1]" (509) and "[0 show 2]" (510). The natural-language utterance "Show me all flights to Chicago" is represented in the chart by the edges 509, 511, 512, 514, 516, and 520. Additional edges in the chart may be labeled by words other than those actually spoken; these edges represent hypothesized words generated by the speech recognizer (510, 513, 515, 517, 518, 519, and 521). The PS tree corresponding to a syntactic analysis of the natural-language utterance is represented in the chart by a set of nonterminal edges. Each nonterminal edge in the set of nonterminal edges corresponds to one nonterminal node in the PS tree and is labeled with the corresponding nonterminal symbol. The edge corresponding to the topmost node in the PS tree is called the root edge. Each nonterminal edge also contains a reference to at least one edge that is dominated by the nonterminal edge. For example, in FIG. 5 the prepositional phrase "to Chicago" is encoded in the chart by the nonterminal edge (522). An example of the encoding of edge references in nonterminal edges is presented in edge reference detail (523). The nonterminal edge (533), labeled with the nonterminal symbol "PP", references both the nonterminal edge (530), labeled with the nonterminal symbol "prep", and the nonterminal edge (532), labeled with the nonterminal symbol "NP". Similarly, the nonterminal edge (530) references the lexical edge (528), labeled with the word "to", and the nonterminal edge (532) references the nonterminal edge (531), labeled with the nonterminal symbol "prop-noun". Finally, the nonterminal edge (531) references the lexical edge (529), labeled with the word "Chicago".

Each edge in the chart encodes the instantiation of a production in one stage of completion. If the production is fully instantiated, as in the above example, then the edge is "complete". If the production is partially instantiated, then the edge is "active". An example of an active edge is presented in active edge detail (534). The active edge (543), labeled with the nonterminal symbol "PP", references the complete edge (540), labeled with the nonterminal symbol "prep", and is "right-active" at the chart vertex (538), labeled "5", with a right remainder (544) consisting of the nonterminal symbol "NP". The active edge (543) therefore encodes the partial instantiation of the production "PP→prep NP" in the chart, at the point during parsing when the nonterminal edge (540), labeled with the nonterminal symbol "prep", has been located, and the parser requires an additional edge, labeled "NP" and starting at the chart vertex (538), in order to complete the active edge (543). A chart parser is "bidirectional" if it can simultaneously process both right-active and left-active edges; i.e., active edges that can extend toward either the end vertex or the start vertex of the chart.

The parser component of an automatic speech recognition (ASR) system determines the structure of an utterance as a crucial step toward determining the utterance's meaning. The parser's usefulness may be increased by combining bidirectionality with "island-driving", which allows the parser to consider words and nonterminal edges in the chart independently of their linear order, a technique that has been shown to be superior to strictly left-to-right processing. However, this improvement has the undesirable side effect of introducing duplicate edges into the chart, since a production can generate an edge from any of its constituent symbols and the resulting edge can expand bidirectionally. A technique is therefore needed to eliminate duplicate edges to avoid a combinatorial explosion of these edges during parser operation. Hence, there is a need for a method, device and system for an efficient generalized bidirectional island-driven chart parser.

BRIEF DESCRIPTION OF THE DRAWINGS

FIG. 5 is a schematic representation of a chart for the simultaneous encoding of the word graph and the parse forest as is known in the art.

FIG. 6 is a schematic representation of edge overgeneration in a naive generalized bidirectional island-driven chart parser without congruency checking.

FIG. 8 is a flow chart of one embodiment of steps in accordance with the edge congruency checking method of the present invention.

DETAILED DESCRIPTION OF A PREFERRED EMBODIMENT

Figure 1:
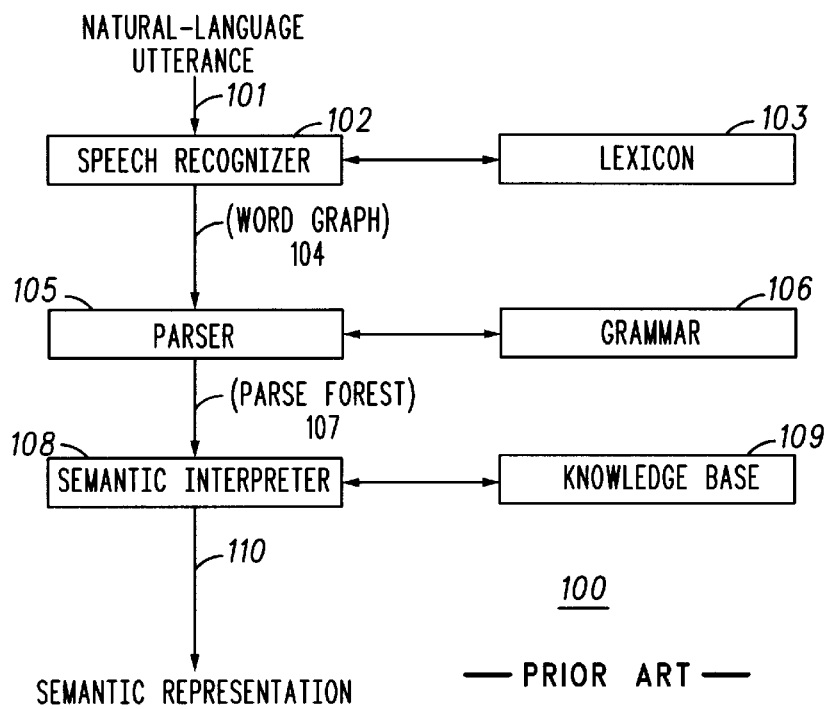
FIG. 1 is a schematic representation of an automatic speech recognizer incorporating a parser as is known in the art.
Figure 2:
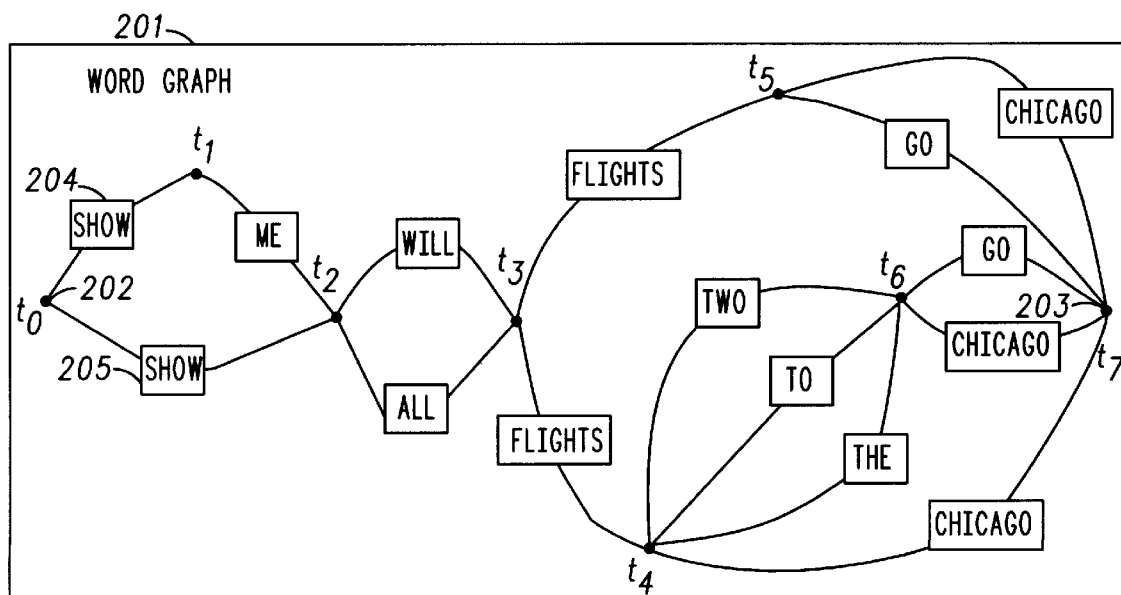
FIG. 2 is a schematic representation of a word graph produced by an automatic speech recognizer as is known in the art.
Figure 3:
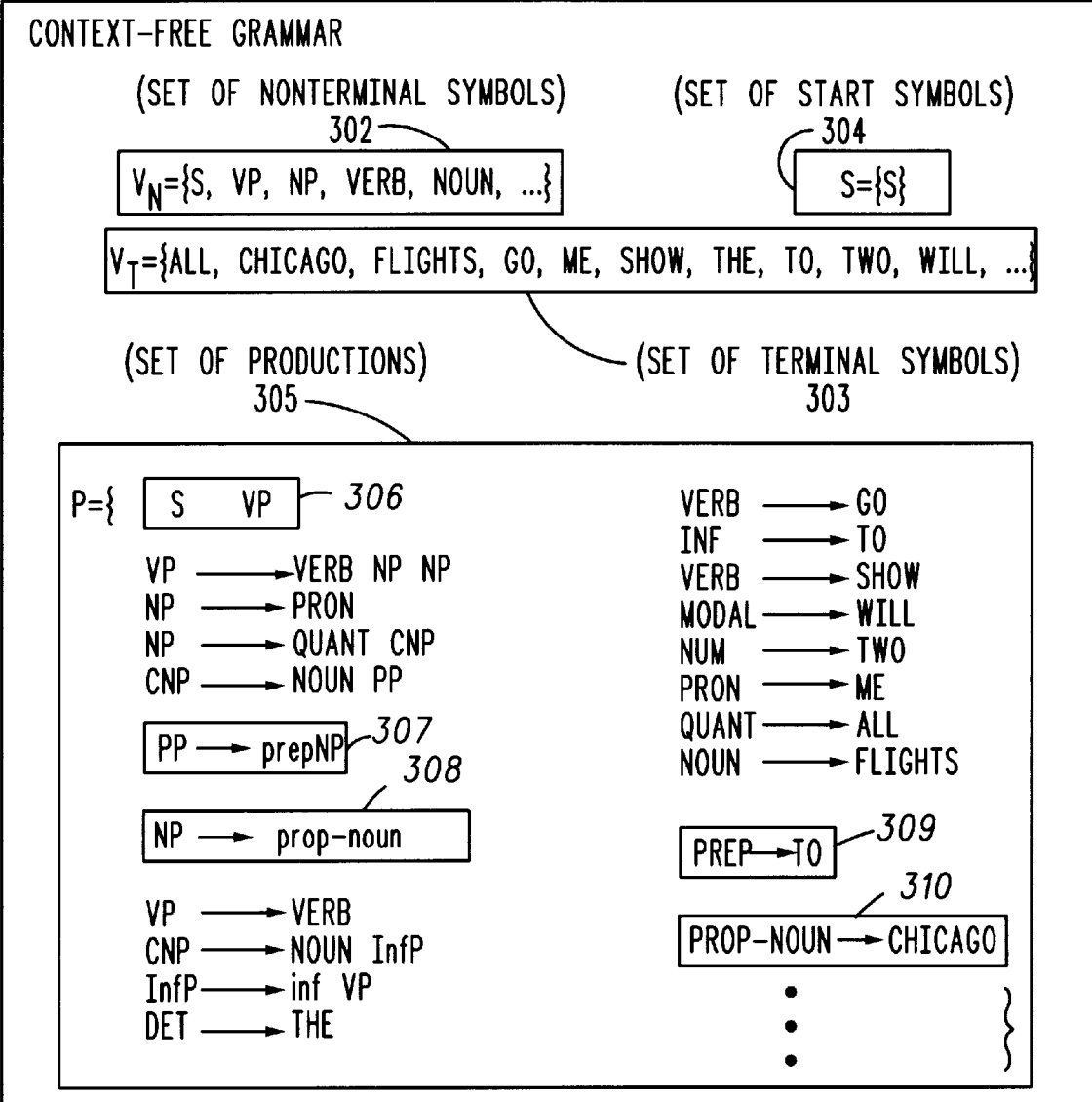
FIG. 3 is a schematic representation of a context-free grammar as is known in the art.
Figure 4:
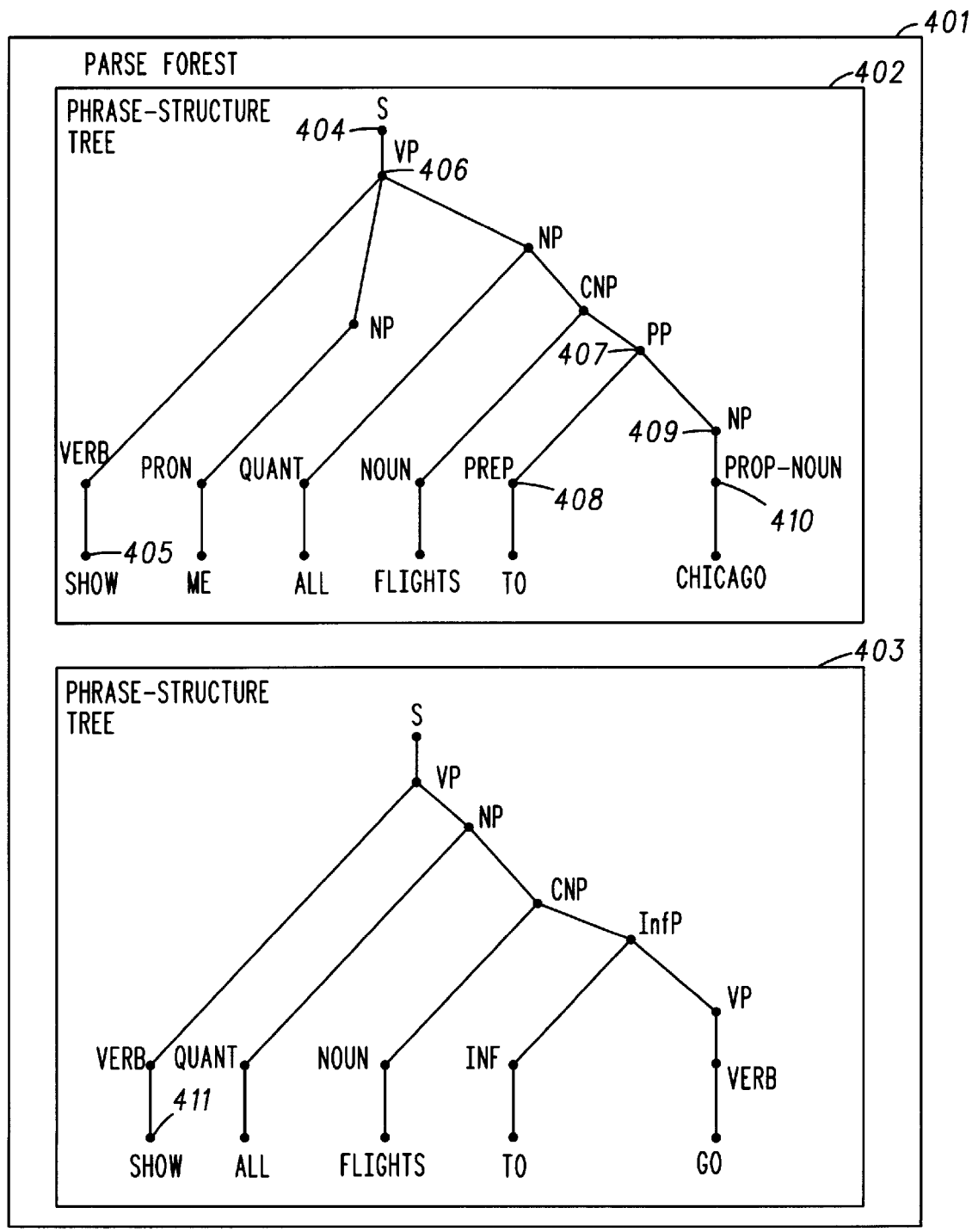
FIG. 4 is a schematic representation of a parse forest containing at least one phrase-structure tree as is known in the art.

The present invention provides a generalized bidirectional island-driven chart parser which is particularly well-suited for robust parsing of the noisy data typically generated by speech recognizers. The generalized bidirectional island-driven chart parser can instantiate edges from any symbol in the productions of a context-free grammar and includes an efficient method for eliminating duplicate edges, thus permitting rapid convergence of parses for real-time operation.

The following discussion is divided into three parts, as follows. The first part presents the notation and terminology relevant to generalized bidirectional island-driven chart parsing. The second part demonstrates the problem of overgeneration of edges in a naive generalized bidirectional island-driven chart parser. The third part discloses how congruence keys are used to prevent the overgeneration of edges in an efficient generalized bidirectional island-driven chart parser.

Generalized bidirectional island-driven chart parsing requires an extension of the chart-parsing concept of "active edge", as follows. An active edge based on the production W→XYZ will be represented as "W[X<m Y n>Z]", where:
1. W∈$V_N$ is one nonterminal symbol that will be the label of the complete edge that will result from the active edge.
2. X∈$\Sigma^*$ is an ordered list of symbols required to complete the leftward extension of the edge and is called the left remainder of the edge.
3. Y∈$\Sigma^*$ is an ordered list of symbols that have already been matched during parsing and is called the completed span of the edge.
4. Z∈$\Sigma^*$ is an ordered list of symbols required to complete the rightward extension of the edge and is called the right remainder of the edge.
5. "<m" and "n>" are extension symbols, where m and n are non-negative integers corresponding to vertices in the chart such that m≦n.

If both X and Z become null during parsing, then the active edge becomes complete, and will be represented as "[m W n]". The edge extension operator "+" therefore operates as follows (on the production "W→A B C D"):
1. Left-extension: A left-active edge at vertex m will be left-extended by any complete edge labeled "B" that ends at vertex m if the rightmost symbol in the left remainder of the left-active edge is "B": [x B m]+W[A B<m C n>D E]=W[A<x B C n>D ].
2. Right-extension: A right-active edge at vertex n will be right-extended by any complete edge labeled "D" that starts at vertex n if the leftmost symbol in the right remainder of the right-active edge is "D": W[A B<m C n>D F]+[n D z]=W[A B<m C D z>E].

An example of bidirectional edge extension involving the entry of an edge based on the production "W→A B C D" at vertex 5 in a chart containing the four complete edges: "[2 A 3]", "[3 B 5 ]", "[5 C 6]", and "[6 A 9]", is presented in Table 1.

TABLE 1

Bidirectional Edge Extension Example

| Edge: | Input: | Extension: | Edge Type: |
|---|---|---|---|
| W[A B <5 5 > C D] | [5 C 6] | W[A B <5 C 6> D] | Both left- and right-active |
| W[A B <5 C 6> D] | [3 B 5] | W[A <3 B C 6> D] | Both left- and right-active |
| W[A <3 B C 6> D] | [6 D 9] | W[A <3 B C D 9>] | Left-active only |
| W[A <3 B C D 9>] | [2 A 3] | [2 W 9] | Complete |

During parsing, introduction of an edge into the chart will result in a generated edge set containing new edges resulting from the extension of the edge relative to edges already in the chart and, if the edge is complete, relative to a relevant set of productions in the grammar. The edges in the generated edge set are stored in an agenda of edges, from which the next edge to be entered in the chart is chosen by a predetermined scheme. An example of the predetermined scheme would be choosing the edge in the agenda with the highest score, where the score is calculated for each edge based upon such salient characteristics as the probability of the production on which the edge is based, the acoustic scores of the words dominated by the edge, etc.

FIG. 6, numeral 600, presents a schematic representation of the process of edge overgeneration in a naive generalized bidirectional island-driven chart parser. The chart (601) contains six vertices, respectively labeled "0" (602), "1" (603), "2" (604), "3" (605), "4" (606), and "5" (607). A complete edge in the chart is drawn with a solid line and can connect any two vertices: the complete edge labeled "a" (608) connects vertices 0 and 1, the complete edge labeled "b" (609) connects vertices 1 and 2, the complete edge labeled "c" (610) connects vertices 2 and 3, the complete edge labeled "d" (611) connects vertices 3 and 4, the complete edge labeled "e" (612) connects vertices 4 and 5, and the complete edge labeled "ζ" (615) connects vertices 1 and 4. An active edge in the chart is drawn with a hollow line and connects any two vertices, with at least one of the vertices marked with an outward-pointing arrow representing the active direction of the edge. In the chart, the active edge labeled "δ" (614) connects vertices 1 and 3, and is active at vertex 3 (where it can continue via a complete edge labeled "d"). Similarly, the active edge labeled "γ" (613) connects vertices 2 and 4, and is active at vertex 2 (where it can continue via a complete edge labeled "b").

As discussed above, overgeneration of edges will result in duplicate edges being entered into the chart. An example of this process is presented in FIG. 6, numeral 600, which presents a partial trace of the instantiation of the production "X→b c d" in a chart containing the terminal string "a b c d e" (connecting vertices 0 through 5). The six distinct edges that may be generated during this process are labeled α through ζ, with ζ being the complete edge that represents a successful instantiation of production R in the chart. The minimal number of edges needed to obtain ζ is three (e.g., {α, δ, ζ}), however, a naïve generalized bidirectional island-driven chart parser will generate eleven edges given this input (since δ and ε can both be generated twice, and ζ can be generated four times). Thus an efficient generalized bidirectional island-driven chart parser requires a method of identifying and eliminating duplicate edges. (The hollow lines in FIG. 6 demonstrate two of the four possible ways of generating ζ—i.e., by right-extending an instance of δ or by left-extending an instance of ε—while δ and ε themselves may both be generated in two different ways (e.g., δ may be generated either by right-extending α or by left-extending β).)

A simplistic solution to the problem of overgeneration of edges would be to develop a mechanism to block an edge from connecting two vertices if they are already connected by an edge generated by the same production. This solution will work for the example presented in FIG. 6; for example, if an instance of δ is generated by the right-extension of α, then the entry of this edge into the chart may be used to block the subsequent entry of an instance of δ generated by the left extension of β. However, this approach fails in the general case, since the productions involved may contain nonterminal symbols in their expansions that in turn dominate dissimilar structures; e.g., given the production "A→B C" and two productions "B→D" and "B→E", the second one of the two structures "A[B[D]C]" and "A[B[E]C]" would be eliminated by the above procedure. What is necessary, therefore, is a generalization of the above procedure which is sensitive to any embedded structures within each edge. In order to develop this generalization, three degrees of edge similarity will be necessary: "equivalence", "equality", and "congruency". These degrees of similarity are defined (in increasing order of restrictiveness) as follows:
1. Two edges are "equivalent" if they have the same starting and ending vertices and the same label.
2. Two equivalent edges are "equal" if they are generated by the same production.
3. Two equal edges are "congruent" if they dominate identical trees.

Given the above definitions, if two complete edges are equivalent, then they will have the same effects as far as the future course of the parse is concerned; i.e., if either of them may be used to extend a given active edge, then both must be used. Furthermore, if two equivalent edges are not equal, then it is clear that these edges will result in different syntactic structures (since their respective trees were generated by different sets of productions).

However, if two equal edges are congruent, then not only will they have the same effects as far as the future course of the parse is concerned (since they are by definition equivalent), but they will also result in the generation of duplicate trees. This is because the previous course of the parse as stored in the trees corresponding to these edges is identical (although the edges in question would necessarily have been generated as the result of a different series of edge extensions, due to the bidirectional and island-driven nature of the parser).

Given a pair of congruent edges, only one should be entered into the chart in order to prevent overgeneration of edges. If two equal edges are not congruent, however, they necessarily encode different trees, and the elimination of one of them would result in the loss of information. In order to ensure parser efficiency and proper coverage, it is therefore necessary to determine if an edge that is about to be entered into the chart is congruent to any edge already present in the chart. If so, then it should be discarded, because its entry into the chart will add no new information to the parse and will result in the generation of duplicate edges.

By definition, the determination of edge congruency requires the comparison of two trees of arbitrary size. This may be accomplished by a simultaneous traversal of the two trees (in order to perform a pairwise comparison of their constituent edges), which halts if any pair is not equal (in which case the two dominating edges are not congruent). If all pairs of constituent edges in the two trees are equal, then the two dominating edges are equal.

This algorithm has two drawbacks: (1) it requires a tree traversal and (2) it lacks a threshold test. An example of the latter would be provided by a comparison of the number of nodes in the two trees; if the two trees contain different numbers of nodes, then they cannot be congruent, which can be determined without the necessity of any pairwise comparisons at all. The threshold test may be implemented by the addition of a numeric field on each edge that indicates the number of nodes that its tree dominates. This information must be explicitly stored to avoid the necessity of a tree traversal; it may be straightforwardly calculated as a consequence of the process of edge generation.

The above approach suggests a method for eliminating the necessity for tree traversal altogether; i.e., the construction of a "congruence key" that encodes the salient points, with respect to congruency determination, of the tree dominated by the edge. The congruence key of a given edge must have the following properties:

1. The congruence key must be constructed from the keys of the edges immediately dominated by the given edge.
2. The congruence key must encode the salient points of the tree dominated by the given edge that are required to determine the equality of its constituent edges.
3. The congruence key must be invariant with respect to the order of edge derivation.
4. The congruence key must have negligible storage requirements.

A congruence key with the above four properties is constructed as follows. As noted above, three elements are necessary to determine edge equality: (1) the starting vertex of the edge, (2) the ending vertex of the edge, and (3) the identity of the production that generated the edge. If the productions in the grammar are uniquely and consecutively numbered, then these three elements may be represented as an ordered triplet of non-negative integers: (s, e, r), where s is the starting vertex (drawn from the range (0, N−1), where N is the number of vertices in the chart), e is the ending vertex (also drawn from the range (0, N−1)), and r is the production number (drawn from the range (0, R−1), where R is the To give an example, in an application with a hundred-vertex chart and a grammar consisting of up to 10,000 productions, a preterminal edge (i.e., one that dominates no nonterminal symbols) generated by production #1,234 in the grammar that spans the chart from vertex 31 to 38 would have a congruence key of C=31381234 (which is straightforwardly decodable as "31-38-1234" to yield the edge's starting vertex, ending vertex, and generating production). If this edge was a nonpreterminal, then its congruence key would be: C'=C∪($V_1$+$V_2$), where $V_1$ is the vector of integers encoding the congruence key for the leftmost edge of the pair that combined to form this edge, $V_2$ is the similar vector for the rightmost edge, "A∩B" represents the operation of merging any two vectors A and B (as further discussed below) and "A+B" is vector concatenation.

Concerning the merging of two congruence keys, the crucial case involves edges generated by non-branching productions (i.e., productions of the form $\alpha \rightarrow \beta$, where $\alpha \in V_N$ and $\beta \in \Sigma$. Given the case where one non-branching production directly dominates another non-branching production, unless the congruence-key vectors are merged (rather than simply being concatenated) the congruence keys for edges dominating structures of this type will not necessarily indicate edge congruency. This is because the starting and ending vertices for both constituent edges are the same and the concatenation order of the resulting keys will depend on the order in which they occur in the parse. congruency. This is because the starting and ending vertices for both constituent edges are the same and the concatenation order of the resulting keys will depend on the order in which they occur in the parse. Thus merging the congruence keys as disclosed will avoid problematic effects based on the order of edge derivation.

Implementation of the above method proceeds as follows. Each lexical edge (dominating one arc, labeled with a word, in the word graph) is constructed with one lexical congruence key consisting of the starting vertex of the lexical edge, the ending vertex of the lexical edge, and a unique number identifying the word. Each non-lexical edge is created in one of the following two ways during parsing.

In the case of an edge created as a consequence of production proposal based on a complete edge, called a production edge, the congruence key of the complete edge is passed to the edge constructor. In the case of an edge created as a consequence of the extension of an active edge by a complete edge, called an extension edge, a composite congruence key is created by the vector concatenation of the congruence keys of the two constituent edges, and is passed to the edge constructor (merging is not necessary in this case because there is no possibility that the rightmost element of the left edge in the extension is greater than the leftmost element of the right edge in the extension). In either case, given the congruence key passed to it, the edge constructor constructs the congruence key of the new edge by means of the edge construction operation disclosed above.

Figure 7A:
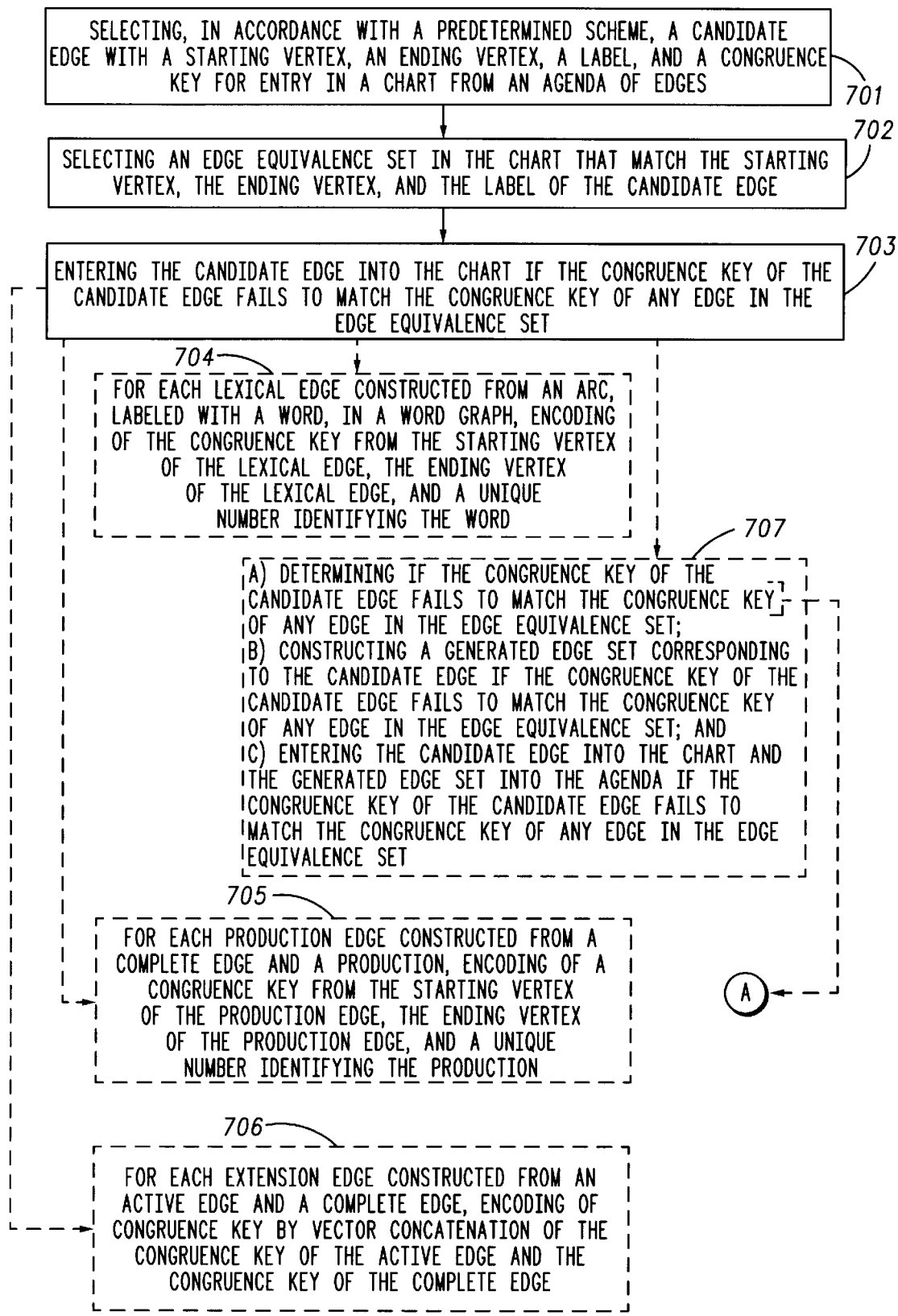
FIG. 7 is a flow chart of one embodiment of steps in accordance with the present invention, which provides efficient means of generalized bidirectional island-driven chart parsing based on congruency checking to prevent edge overgeneration

As shown in the steps set forth in FIG. 7, numeral 700, the method of the present invention provides the efficient means of generalized bidirectional island-driven chart parsing based on congruency checking to prevent edge overgeneration. The method includes the steps of: A) selecting (701), in accordance with a predetermined scheme, a candidate edge with a starting vertex, an ending vertex, a label, and a congruence key for entry in a chart from an agenda of edges; B) identifying (702) an edge equivalence set in the chart that matches the starting vertex, the ending vertex, and the label of the candidate edge; and C) entering (703) the candidate edge into the chart if the congruence key of the candidate edge fails to match the congruence key of any edge in the edge equivalence set.

Where selected, the method of FIG. 7, in the step (703) of entering the candidate edge into the chart if the congruence key of the candidate edge fails to match the congruence key of any edge in the edge equivalence set may include (707): (A) determining if the congruence key of the candidate edge fails to match the congruence key of any edge in the edge equivalence set; (B) constructing a generated edge set corresponding to the candidate edge if the congruence key of the candidate edge fails to match the congruence key of any edge in the edge equivalence set; and (C) entering the candidate edge into the chart and the generated edge set into the agenda if the congruence key of the candidate edge fails to match the congruence key of any edge in the edge equivalence set.

Where selected, the method of FIG. 7 may further include, for each lexical edge constructed from an arc, labeled with a word, in a word graph, encoding of the congruence key from the starting vertex of the lexical edge, the ending vertex of the lexical edge, and a unique number identifying the word (704).

Also the method of FIG. 7 may further include, for each production edge constructed from a complete edge and a production, encoding of a congruence key from the starting vertex of the production edge, the ending vertex of the production edge, and a unique number identifying the production (705).

Also, the method of FIG. 7 may further include, for each extension edge constructed from an active edge and a complete edge, encoding of a congruence key by vector concatenation of the congruence key of the active edge and the congruence key of the complete edge (706).

If desired, in the method of FIG. 7, determining if the congruence key of the candidate edge fails to match the congruence key of any edge in the edge equivalence set may include comparing the congruence key for an edge $E_1$ with the congruence key for an edge $E_2$ and may be accomplished by a pairwise comparison of a vector $V_1$ encoding the congruence key for the edge $E_1$ with a vector $V_2$ encoding the congruence key for the edge $E_2$ (709).

Also, in this embodiment, the steps may further include, prior to the pairwise comparison of the vector encoding the congruence key for the edge $E_1$ with the vector encoding the congruence key for the edge $E_2$, performing a threshold test comprising the steps of (708): (A) determining a length $L_1$ of the vector $V_1$ encoding the congruence key for the edge $E_1$ and a length $L_2$ of the vector $V_2$ encoding the congruence key for the edge $E_2$; (B) comparing the length $L_1$ of the vector $V_1$ and the length $L_2$ of the vector $V_2$; and (C) signaling edge non-congruency if $L_1 \neq L_2$ and signaling edge congruency if $L_1 = L_2$.

As shown in the steps set forth in FIG. 8, numeral 800, the method of the present invention provides the efficient means of determining the congruency of an edge $E_1$ and an edge $E_2$ by using a threshold test (801) and an exact test (803). The method includes the steps of: A) obtaining (801) a length $L_1$ of a vector $V_1$ encoding the congruence key for an edge $E_1$ and obtaining a length $L_2$ of a vector $V_2$ encoding the congruence key for an edge $E_2$; B) signaling (802) non-congruency if $L_1 \neq L_2$; C) performing (803) a pairwise comparison of $V_1$ and $V_2$ otherwise; D) signaling (804) non-congruency if any element pair in $V_1$ and $V_2$ is not equal; and E) signaling (805) congruency otherwise. The pairwise comparison of $V_1$ and $V_2$ would typically proceed by comparing each corresponding pair of elements ($v_i$, $v_i'$), where $v_i \in V_1$ and $v_i \in V_2$ and i is an index ranging from 1 to $L_1$, halting for the first value of i where $v_i \neq v_i'$.

Figure 9:
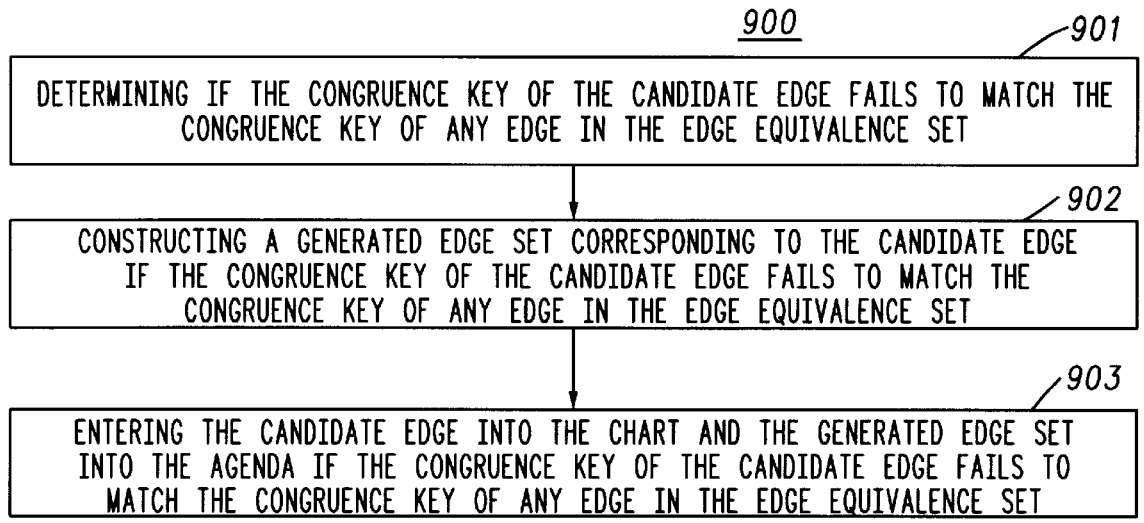
FIG. 9 is a flow chart of one embodiment of steps in accordance with the generated edge set construction method of the present invention.

As shown in the steps set forth in FIG. 9, numeral 900, the method of the present invention provides the efficient means of entering the candidate edge into the chart. The method includes the steps of: A) determining (901) if the congruence key of the candidate edge fails to match the congruence key of any edge in the edge equivalence set; B) constructing (902) a generated edge set corresponding to the candidate edge if the congruence key of the candidate edge fails to match the congruence key of any edge in the edge equivalence set; and C) entering (903) the candidate edge into the chart and the generated edge set into the agenda if the congruence key of the candidate edge fails to match the congruence key of any edge in the edge equivalence set.

Figure 10:
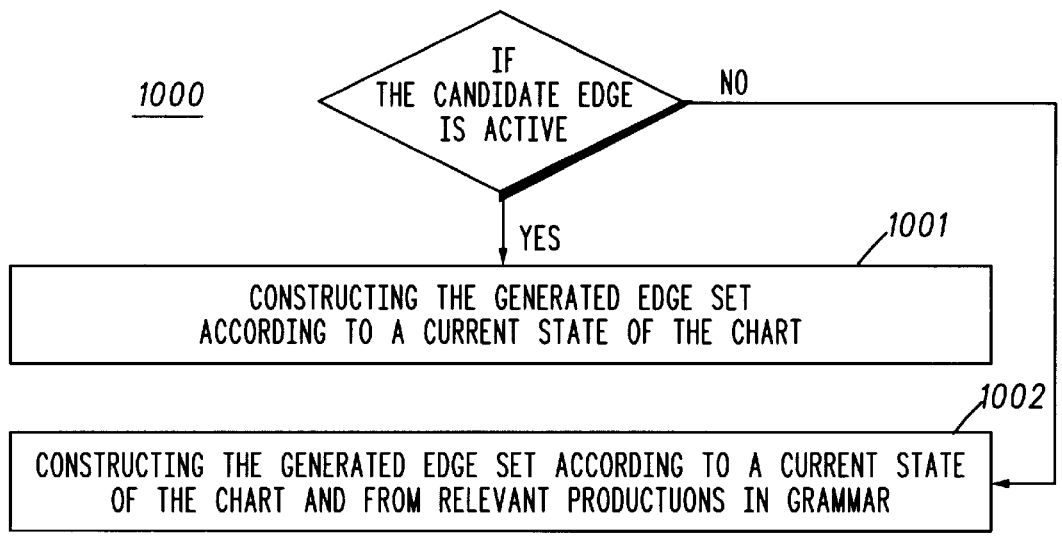
FIG. 10 is a flow chart of one embodiment of steps in accordance with the edge construction method of the present invention.

As shown in the steps set forth in FIG. 10, numeral 1000, the method of the present invention provides the efficient means of constructing the generated edge set. The method includes the steps of: A) constructing (1001) the generated edge set according to a current state of the chart if the candidate edge is active; and B) constructing (1002) the generated edge set according to the current state of the chart and relevant productions in grammar if the candidate edge is complete.

Figure 11:
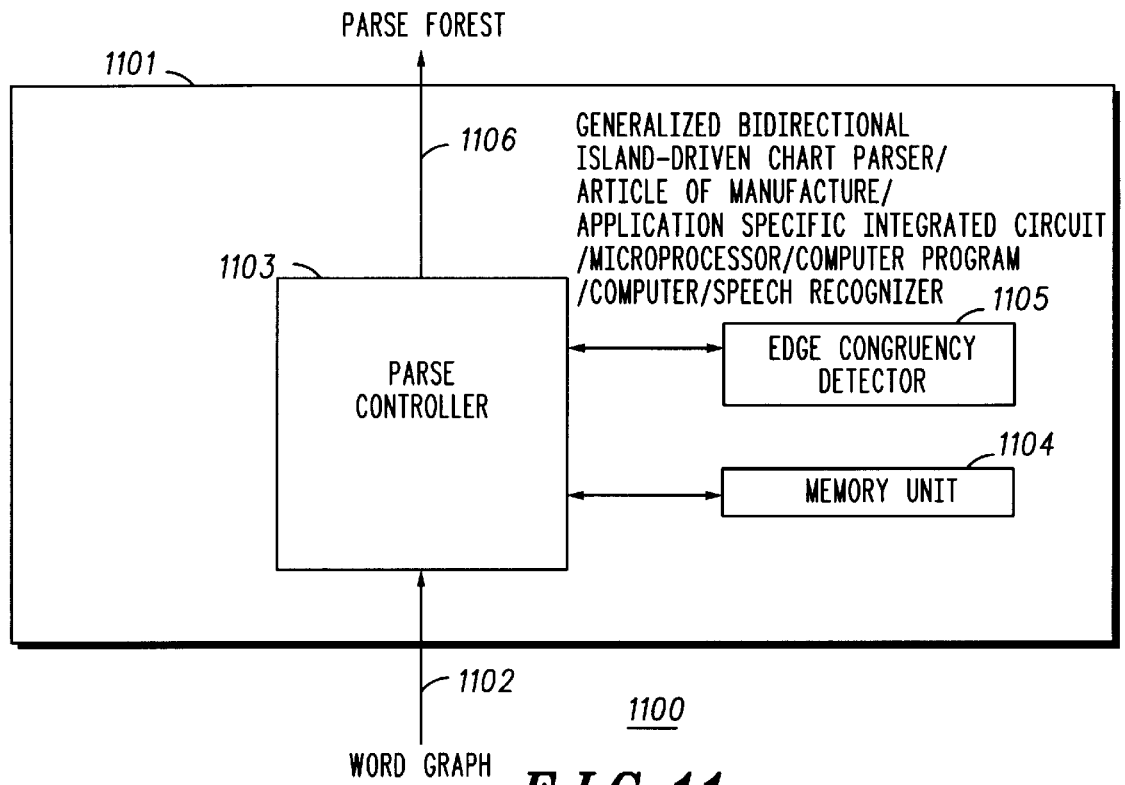
FIG. 11 is a schematic representation of one embodiment of a device/system in accordance with the present invention, which parses word graphs using generalized bidirectional island-driven chart parsing.

FIG. 11, numeral 1100, is a schematic representation of one embodiment of a device/system in accordance with the present invention, which parses word graphs using bidirectional island-driven parsing. The device/system (1101) is typically an article of manufacture, an application specific integrated circuit (ASIC), a microprocessor, a computer program, a computer, a speech recognizer or the like. The device/system (1101) receives as input a word graph (1102) and produces as output a corresponding parse forest (1106). The device/system typically consists of a parse controller (1103) coupled to an edge congruency detector (1105) and a memory unit (1104). The edge congruency detector prevents the introduction of duplicate edges during parsing.

Figure 12:
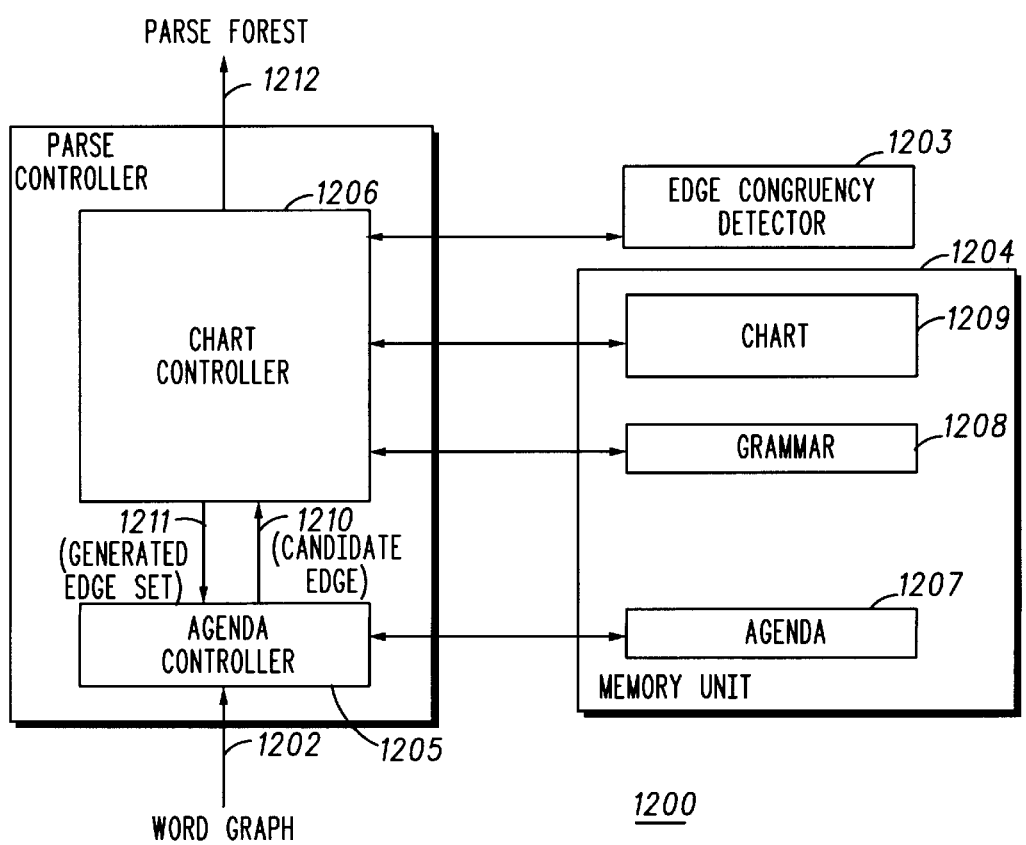
FIG. 12 is a schematic representation of one embodiment of a device/system in accordance with the parse controller of the present invention.

FIG. 12, numeral 1200, is a schematic representation of one embodiment of a device/system in accordance with the parse controller (1201) of the present invention. The parse controller contains an agenda controller (1205) and a chart controller (1206). The agenda controller is coupled to an agenda (1207) in the memory unit (1204). The chart controller is coupled to the edge congruency detector (1203) and to a chart (1209) and a grammar (1208) in the memory unit. The agenda controller selects a candidate edge (1210) from the agenda according to a predetermined scheme and passes it to the chart controller. If the chart controller determines that the candidate edge fails to be congruent to any edge already in the chart, then a generated edge set (1211) is constructed and passed to the agenda controller for entry in the agenda. If the chart controller encounters a predetermined parse tree construction condition, then it outputs the parse forest (1212).

Figure 13:
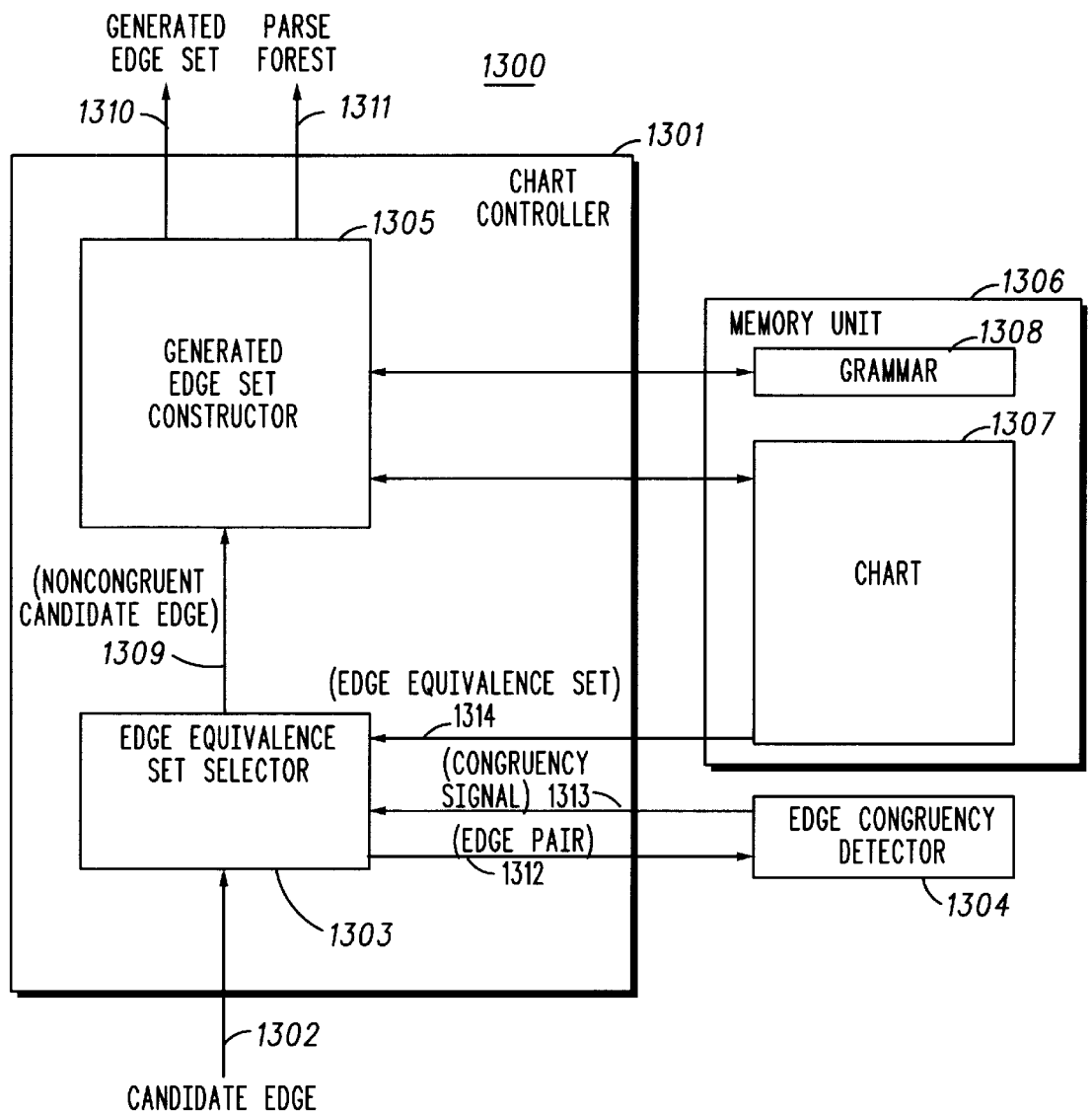
FIG. 13 is a schematic representation of one embodiment of a device/system in accordance with the chart controller of the present invention.

FIG. 13, numeral 1300, is a schematic representation of one embodiment of a device/system in accordance with the chart controller (1301) of the present invention. The chart controller contains an edge equivalence set selector (1303)

and a generated edge set constructor (1305). The edge equivalence set selector is coupled to the chart (1307) in the memory unit (1306) and to the edge congruency detector (1304). The edge equivalence set selector receives the candidate edge (1302) and selects an edge equivalence set (1314) from the chart. Each edge in the edge equivalence set has the same starting vertex, ending vertex, and label as the candidate edge. An edge pair (1312) is constructed for each edge from the edge equivalence set by combining the edge from the edge equivalence set with the candidate edge. Each edge pair is then submitted to the edge congruency detector, which emits a congruency signal (1313) of "True" if the edges in the edge pair are congruent and "False" otherwise. If the edge congruency detector emits a "False" signal for every edge pair constructed from the edge equivalence set, then the candidate edge is not congruent to any edge in the equivalence set and is thus determined to be a noncongruent candidate edge (1309). The noncongruent candidate edge is passed to the generated edge set constructor. The generated edge set constructor is coupled to the chart (1307) and the grammar (1308) in the memory unit (1306). The generated edge set constructor constructs and outputs a generated edge set (1310) as discussed below. If the generated edge set constructor encounters a predetermined parse forest construction condition, then the generated edge set constructor also outputs the parse forest (1311) as discussed below.

Figure 14:
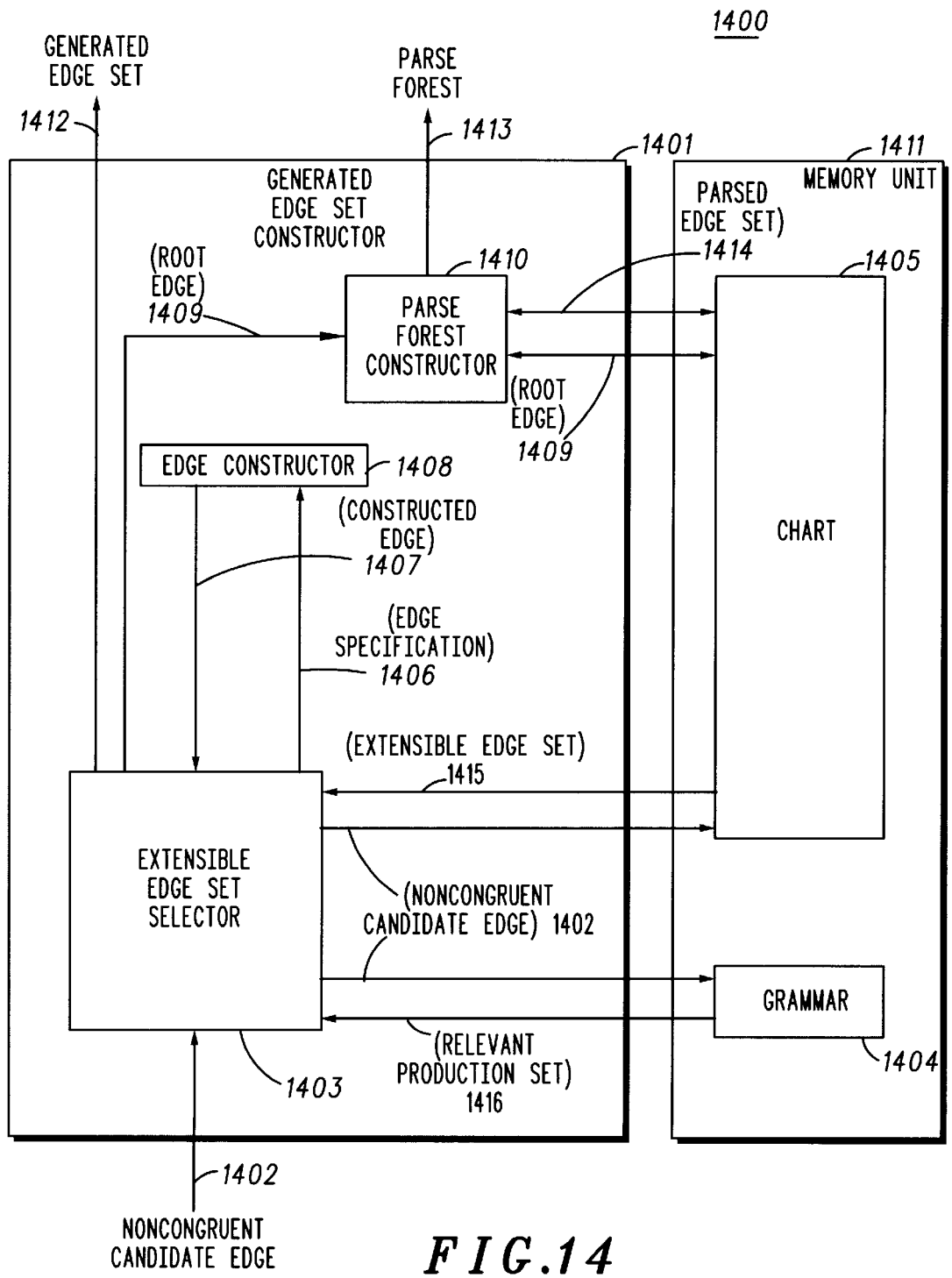
FIG. 14 is a schematic representation of one embodiment of a device/system in accordance with the generated edge set constructor of the present invention.

FIG. 14, numeral 1400, is a schematic representation of one embodiment of a device/system in accordance with the generated edge set constructor (1401) of the present invention. The generated edge set constructor consists of an extensible edge set selector (1403), an edge constructor (1408), and a parse forest constructor (1410). The extensible edge set selector is coupled to the grammar (1404) and the chart (1405) in the memory unit (1411). The extensible edge set selector receives the noncongruent candidate edge (1402) and inserts the noncongruent candidate edge (1402) into the chart. The extensible edge set selector then selects an extensible edge set (1415) for the noncongruent candidate edge from the chart as disclosed above. If the noncongruent candidate edge is complete, then the extensible edge set selector also selects a relevant production set (1416) from the grammar as disclosed above. An edge specification (1406) for the extension of the noncongruent candidate edge is constructed corresponding to each edge and production selected by the extensible edge set constructor. Each edge specification is passed to the edge constructor, which constructs a corresponding constructed edge (1407). The constructed edge is added to the generated edge set (1412). If the generated edge set contains a root edge (1409), labeled by one start symbol in the grammar, then the root edge is passed to the parse forest constructor (1410), which constructs the corresponding PS tree from the parsed edge set (1414) in the chart corresponding to the root edge, and adds it to the parse forest (1413).

Figure 15:
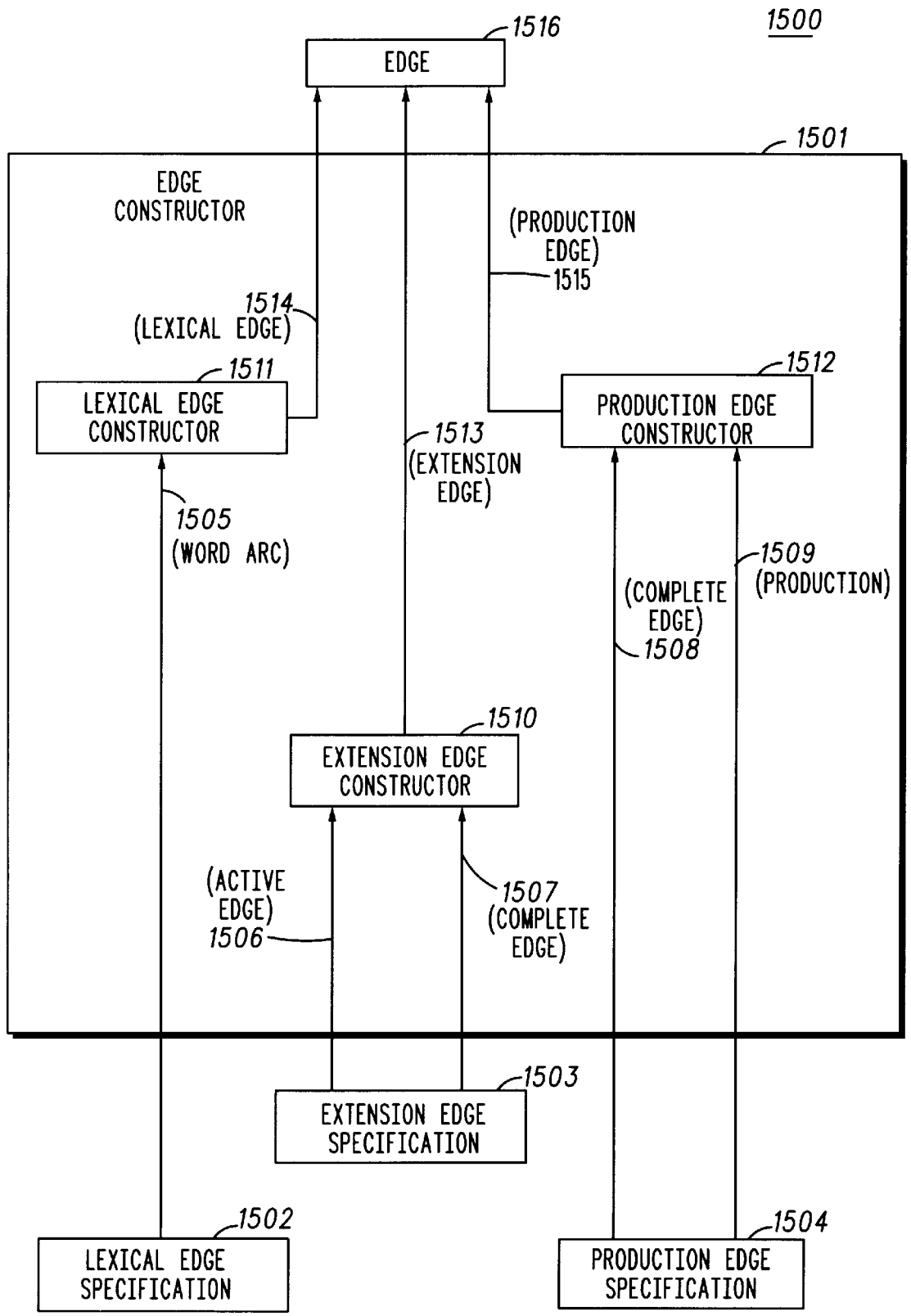
FIG. 15 is a schematic representation of one embodiment of a device/system in accordance with the edge constructor of the present invention.

FIG. 15, numeral 1500, is a schematic representation of one embodiment of a device/system in accordance with the edge constructor (1501) of the present invention, which constructs an edge (1 516) corresponding to an edge specification (1502,1503,1504). A lexical edge specification (1502), containing a word arc (1505) is passed to the lexical edge constructor, which constructs a lexical edge (1514) with a corresponding congruence key as disclosed above. An extension edge specification (1503), containing an active edge (1506) and a complete edge (1507), is passed to the extension edge constructor, which constructs an extension edge (1513) with a corresponding congruence key as disclosed above. A production edge specification (1504), containing a complete edge (1508) and a production (1509), is passed to the production edge constructor (1512), which constructs a production edge (1515) with a corresponding congruence key as disclosed above.

Figure 16:
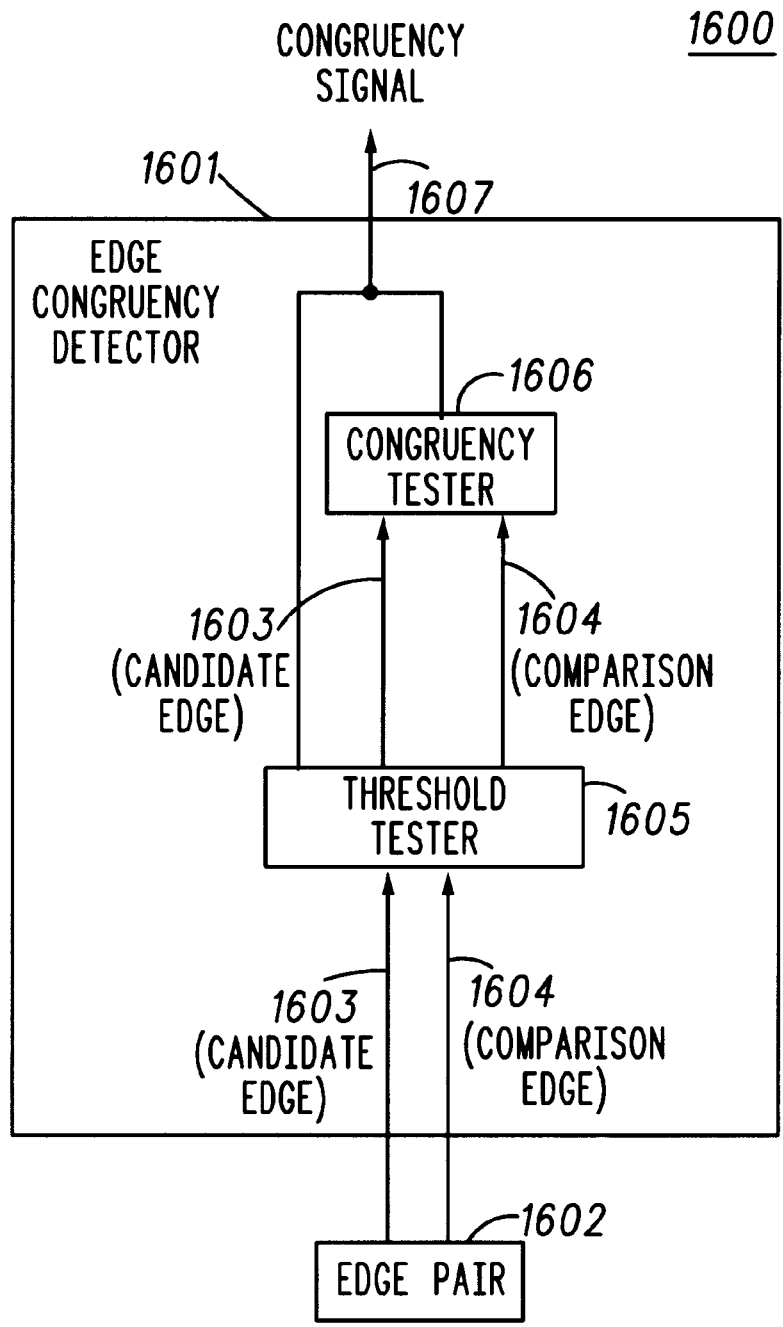
FIG. 16 is a schematic representation of one embodiment of a device/system in accordance with the edge congruency detector of the present invention.

FIG. 16, numeral 1600, is a schematic representation of one embodiment of a device/system in accordance with the edge congruency detector (1601) of the present invention, which emits the congruency signal (1607) corresponding to the edge pair (1602). The edge pair contains a candidate edge (1603) and a comparison edge (1604). The edge pair is input into a threshold tester (1605), which emits the congruency signal "False" if the candidate edge fails the threshold test determining congruency with the comparison edge. An example of a threshold test would be a comparison of the lengths of the vectors encoding the congruence keys of the two edges, because if the lengths differ then the two edges cannot be congruent. Otherwise the edge pair is passed to a congruency tester (1606), which performs an exact congruency test. An example of an exact congruency test would be a pairwise comparison of the vectors encoding the congruence keys of the two edges. Based on the exact congruency test, the congruency tester emits the congruency signal "True" if the edge pair is determined to be congruent; otherwise the congruency tester emits the congruency signal "False".

The method may be implemented by computer readable program code on a computer usable medium. Software implementing the method may be embedded in a microprocessor or a digital signal processor. The system may be embodied in a tangible medium having computer program code. Alternatively, an application specific integrated circuit (ASIC) may implement the method, or a combination of any of these implementations may be used. For example, the method may be implemented by a computer or a speech recognizer.

Thus, the present invention may be embodied in an article of manufacture such as an application specific integrated circuit, a microprocessor, a computer program, a computer or a speech recognizer which is used for parsing word graphs into parse forests. Where the article of manufacture includes a device for implementing a computer usable medium, the computer usable medium typically includes a computer readable program code thereon for implementing the following software routines. Alternatively, the article of manufacture may include hardware circuitry to implement the software routines. The hardware circuitry of the article of manufacture includes a parse controller (1103), an edge congruency detector (1105) and a memory unit (1104). The parse controller (1103) is coupled to receive a word graph (1102) and is for producing a corresponding parse forest (1106), as described more specifically above.

In the article of manufacture the parse controller generally includes an agenda controller (1205) and a chart controller (1206). The agenda controller is coupled to an agenda (1207) in the memory unit (1204). The chart controller is coupled to the edge congruency detector (1203) and to a chart (1209) and a grammar (1208) in the memory unit. The agenda controller selects a candidate edge (1210) from the agenda according to a predetermined scheme and passes it to the chart controller. If the chart controller determines that the candidate edge fails to be congruent to any edge already in the chart, then a generated edge set (1211) is constructed and passed to the agenda controller for entry in the agenda. If the chart controller encounters a predetermined parse tree construction condition, then it outputs the parse forest (1212).

The chart controller (1301) generally includes an edge equivalence set selector (1303) and a generated edge set constructor (1305). The edge equivalence set selector is coupled to the chart (1307) in the memory unit (1306) and to the edge congruency detector (1304). The edge equivalence set selector receives the candidate edge (1302) and selects an edge equivalence set (1314) from the chart. If the edge equivalence set selector determines the candidate edge to be noncongruent as described more specifically above, then a noncongruent candidate edge (1309) is passed to the generated edge set constructor. The generated edge set constructor is coupled to the chart (1307) and the grammar (1308) in the memory unit (1306). The generated edge set constructor constructs and outputs the generated edge set (1310) as described more specifically above. If the generated edge set constructor encounters a predetermined parse forest construction condition, then the generated edge set constructor also outputs the parse forest (1311) as described more specifically above.

The generated edge set constructor (1401) generally includes an extensible edge set selector (1403), an edge constructor (1408), and a parse forest constructor (1410). The extensible edge set selector is coupled to the grammar (1404) and the chart (1405) in the memory unit (1411). The extensible edge set selector receives the noncongruent candidate edge (1402) and inserts the noncongruent candidate edge into the chart. The extensible edge set selector then selects an extensible edge set (1415) for the noncongruent candidate edge from the chart as described more specifically above. If the noncongruent candidate edge is complete, then the extensible edge set selector also selects a relevant production set (1416) from the grammar as described more specifically above. An edge specification (1406) for the extension of the noncongruent candidate edge is constructed corresponding to each edge and production selected by the extensible edge set constructor. Each edge specification is passed to the edge constructor, which constructs a corresponding constructed edge (1407). The constructed edge is added to the generated edge set (1412). If the generated edge set contains a root edge (1409), labeled by one start symbol in the grammar, then the root edge is passed to the parse forest constructor (1410), which constructs the corresponding PS tree and adds it to the parse forest (1413).

The edge constructor (1501) generally includes an extension edge constructor (1510), a lexical edge constructor (1511), and a production edge constructor (1512). The edge constructor constructs an edge (1516) corresponding to an edge specification (1502, 1503, 1504) as described more specifically above.

The edge congruency detector (1601) generally includes a threshold tester (1605) and a congruency tester (1606). The edge congruency detector emits a congruency signal (1607) corresponding to an edge pair (1602). The edge pair contains a candidate edge (1603) and a comparison edge (1604). The edge pair is input into the threshold tester (1605), which emits a congruency signal of "False" if the candidate edge fails the threshold test determining congruency with the comparison edge. Otherwise the edge pair is passed to the congruency tester (1606), which performs an exact congruency test and emits a congruency signal as described more specifically above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A method for processing natural language using generalized bidirectional island-driven chart parsing based on congruency checking to prevent edge overgeneration, comprising the steps of:
   A) selecting, in accordance with a predetermined scheme, a candidate edge with a starting vertex, an ending vertex, a label, and a congruence key for determining edge congruency, wherein edge congruency exists when a plurality of equal edges dominate at least one identical tree, for entry in a chart from an agenda of edges;
   B) selecting an edge equivalence set in the chart that match the starting vertex, the ending vertex, and the label of the candidate edge; and
   C) entering the candidate edge into the chart if the congruence key of the candidate edge fails to match the congruence key of any edge in the edge equivalence set.

2. The method of claim 1 wherein Step C comprises the steps of:
   A) determining if the congruence key of the candidate edge fails to match the congruence key of any edge in the edge equivalence set;
   B) constructing a generated edge set corresponding to the candidate edge if the congruence key of the candidate edge fails to match the congruence key of any edge in the edge equivalence set; and
   C) entering the candidate edge into the chart and the generated edge set into the agenda if the congruence key of the candidate edge fails to match the congruence key of any edge in the edge equivalence set.

3. The method of claim 2 wherein Step C comprises the steps of:
   A) constructing the generated edge set according to a current state of the chart if the candidate edge is active; and
   B) constructing the generated edge set according to the current state of the chart and relevant productions in grammar if the candidate edge is complete.

4. The method of claim 3 further including, for each extension edge constructed from an active edge and a complete edge, encoding of a congruence key by vector concatenation of the congruence key of the active edge and the congruence key of the complete edge.

5. The method of claim 3, Step B, further including, for each lexical edge constructed from an arc, labeled with a word, in a word graph, encoding of the congruence key from the starting vertex of the lexical edge, the ending vertex of the lexical edge, and a unique number identifying the word.

6. The method of claim 3, Step B, further including, for each production edge constructed from a complete edge and a production, encoding of a congruence key from the starting vertex of the production edge, the ending vertex of the production edge, and a unique number identifying the production.

7. The method of claim 2, Step A, where comparing the congruence key for an edge $E_1$ with the congruence key for an edge $E_2$ is accomplished by a pairwise comparison of a vector $V_1$ encoding the congruence key for the edge $E_1$ with a vector $V_2$ encoding the congruence key for the edge $E_2$.

8. The method of claim 7 further including, prior to the pairwise comparison of the vector $V_1$ encoding the congruence key for the edge $E_1$ with the vector $V_2$ encoding the congruence key for the edge $E_2$, performing a threshold test comprising the steps of:

A) determining a length $L_1$ of the vector $V_1$ encoding the congruence key for the edge $E_1$ and a length $L_2$ of the vector $V_2$ encoding the congruence key for the edge $E_2$; and B) comparing the length $L_1$ of the vector $V_1$ and the length $L_2$ of the vector $V_2$; and C) signaling edge non-congruency if $L_1 \neq L_2$ and signaling edge congruency if $L_1 = L_2$.

9. An article of manufacture/computer program/computer/speech recognizer for processing natural language using generalized bidirectional island-driven chart parsing based on a congruency checking to prevent edge overgeneration, having a computer usable medium with a computer readable program code thereon wherein the computer readable program code implements the steps of:

A) selecting, in accordance with a predetermined scheme, a candidate edge with a starting vertex, an ending vertex, a label, and a congruence key for determining edge congruency, wherein edge congruency exists when a plurality of equal edges dominate at least one identical tree, for entry in a chart from an agenda of edges;

B) selecting an edge equivalence set in the chart that match the starting vertex, the ending vertex, and the label of the candidate edge; and C) entering the candidate edge into the chart if the congruence key of the candidate edge fails to match the congruence key of any edge in the edge equivalence set.

10. The article of manufacture/computer program/computer/speech recognizer of claim 9 wherein entering the candidate edge into the chart if the congruence key of the candidate edge fails to match the congruence key of any edge in the edge equivalence set includes:

A) determining if the congruence key of the candidate edge fails to match the congruence key of any edge in the edge equivalence set;

B) constructing a generated edge set corresponding to the candidate edge if the congruence key of the candidate edge fails to match the congruence key of any edge in the edge equivalence set; and C) entering the candidate edge into the chart and the generated edge set into the agenda if the congruence key of the candidate edge fails to match the congruence key of any edge in the edge equivalence set.

11. The article of manufacture/computer program/computer/speech recognizer of claim 10 wherein determining if the congruence key of the candidate edge fails to match the congruence key of any edge in the edge equivalence set includes comparing the congruence key for an edge $E_1$ with the congruence key for an edge $E_2$ and is accomplished by a pairwise comparison of a vector $V_1$ encoding the congruence key for the edge $E_1$ with a vector $V_2$ encoding the congruence key for the edge $E_2$.

12. The article of manufacture/computer program/computer/speech recognizer of claim 11 further including, prior to the pairwise comparison of the vector encoding the congruence key for the edge $E_1$ with the vector encoding the congruence key for the edge $E_2$, performing a threshold test comprising the steps of:

A) determining a length $L_1$ of the vector $V_1$ encoding the congruence key for the edge $E_1$ and a length $L_2$ of the vector $V_2$ encoding the congruence key for the edge $E_2$;

B) comparing the length $L_1$ of the vector $V_1$ and the length $L_2$ of the vector $V_2$; and C) signaling edge non-congruency if $L_1 \neq L_2$ and signaling edge congruency if $L_1 = L_2$.

13. The article of manufacture/computer program/computer/speech recognizer of claim 9 further including, for each lexical edge constructed from an arc, labeled with a word, in a word graph, encoding of the congruence key from the starting vertex of the lexical edge, the ending vertex of the lexical edge, and a unique number identifying the word.

14. The article of manufacture/computer program/computer/speech recognizer of claim 9 further including, for each production edge constructed from a complete edge and a production, encoding of a congruence key from the starting vertex of the production edge, the ending vertex of the production edge, and a unique number identifying the production.

15. The article of manufacture/computer program/computer/speech recognizer of claim 9 further including, for each extension edge constructed from an active edge and a complete edge, encoding of a congruence key by vector concatenation of the congruence key of the active edge and the congruence key of the complete edge.

16. An article of manufacture/application specific integrated circuit/microprocessor for processing natural language using generalized bidirectional island-driven chart parsing based on congruency checking to prevent edge overgeneration, comprising:

A) a parse controller, coupled to receive a word graph, for generating a parse forest;

B) a memory unit, coupled to the parse controller; and

C) an edge congruency detector, coupled to the parse controller, for determining if a pair of edges is congruent by comparing a pair of congruence keys associated with the pair of edges.

17. The article of manufacture/application specific integrated circuit/microprocessor of claim 16 wherein the parse controller comprises:

A) an agenda controller, coupled to an agenda in the memory unit and coupled to receive the word graph and a generated edge set, for generating a candidate edge; and B) a chart controller, coupled to the edge congruency detector and to a grammar and a chart in the memory unit, and coupled to receive the candidate edge, for generating the generated edge set and the parse forest.

18. The article of manufacture/application specific integrated circuit/microprocessor of claim 17 wherein the chart controller comprises:

A) an edge equivalence set selector, coupled to the edge congruency detector and to the chart in the memory unit, and coupled to receive the candidate edge, an edge equivalence set, and a congruency signal, for producing an edge pair and a noncongruent candidate edge; and B) a generated edge set constructor, coupled to the chart and the grammar in the memory unit, and coupled to receive the noncongruent candidate edge, for generating the generated edge set and a parse forest.

19. The article of manufacture/application specific integrated circuit/microprocessor of claim 18 wherein the generated edge set constructor comprises:

A) an extensible edge set selector, coupled to the chart and the grammar in the memory unit, and coupled to receive the noncongruent candidate edge, a constructed edge, and a relevant production set, for generating an edge specification, a root edge, a noncongruent candidate edge, and the generated edge set;

B) an edge constructor, coupled to receive the edge specification, for generating the constructed edge; and C) a parse forest constructor, coupled to the chart in the memory unit, and coupled to receive a root edge and a parsed edge set, for constructing the parse forest and providing the root edge to the chart.

20. The article of manufacture/application specific integrated circuit/microprocessor of claim 18 wherein the edge constructor for constructing one of a lexical edge, an extension edge, and a production edge, comprises:

A) a lexical edge constructor, coupled to receive a lexical edge specification, for producing a lexical edge;

B) an extension edge constructor, coupled to receive an extension edge specification, for producing an extension edge; and C) a production edge constructor, coupled to receive a production edge specification, for producing a production edge.

21. The article of manufacture/application specific integrated circuit/microprocessor of claim 16 wherein the edge congruency detector comprises:

A) a threshold tester, coupled to receive an edge pair, for producing a congruency signal; and B) a congruency tester, coupled to receive the edge pair, for producing the congruency signal.

* * * * *